United States Patent
Harman

[11] Patent Number: 6,052,908
[45] Date of Patent: Apr. 25, 2000

[54] GAME KNIFE

[76] Inventor: Wes F. Harman, 650 Stonespring Rd., Harrisonburg, Va. 22801

[21] Appl. No.: 09/185,741

[22] Filed: Nov. 4, 1998

Related U.S. Application Data

[60] Provisional application No. 60/064,545, Nov. 5, 1997.

[51] Int. Cl.[7] .................................................. B26B 3/00
[52] U.S. Cl. ................................. 30/294; 30/314; 30/353
[58] Field of Search ............................. 30/280, 286, 294, 30/314, 317, 353; D8/20, 98; D22/118

[56] References Cited

U.S. PATENT DOCUMENTS

| | | | |
|---|---|---|---|
| 80,242 | 7/1868 | Tongue | 30/353 |
| D. 320,544 | 10/1991 | Thompson | D8/98 |
| 449,031 | 3/1891 | Bernard | 30/295 |
| 527,175 | 10/1894 | Hurd | 30/286 |
| 541,963 | 7/1895 | Carpenter | 30/294 |
| 912,146 | 2/1909 | Moffett | 30/353 |
| 1,546,975 | 7/1925 | Feller | 30/286 |
| 1,843,223 | 2/1932 | Hasseler . | |
| 2,493,128 | 1/1950 | Fulkerson | 30/353 |
| 3,241,236 | 3/1966 | Capps . | |
| 3,363,315 | 1/1968 | Anderson . | |
| 3,605,268 | 9/1971 | Cassell, Sr. . | |
| 3,791,033 | 2/1974 | Regan | 30/287 |
| 3,883,952 | 5/1975 | Strovas | 30/299 |
| 3,918,158 | 11/1975 | Debski | 30/314 |
| 4,198,751 | 4/1980 | Egbert | 30/286 |
| 4,283,854 | 8/1981 | Austin | 30/314 |
| 4,607,432 | 8/1986 | Montgomery | 30/294 |
| 5,359,778 | 11/1994 | Seber et al. | 30/294 |

FOREIGN PATENT DOCUMENTS

| | | | |
|---|---|---|---|
| 79438 | 6/1955 | Denmark | 30/294 |
| 1 225 073 | 9/1966 | Germany . | |
| 2 741 692 | 3/1979 | Germany . | |

*Primary Examiner*—Hwei-Siu Payer
*Attorney, Agent, or Firm*—Richard C. Litman

[57] ABSTRACT

A knife for cleaning and dressing an animal. More specifically, the knife comprises a blade having a perimeter defined by a parabolic cutting section, a straight cutting edge, a blunt top edge, blade sleeves, pins and a handle. The parabolic cutting section includes a front portion, a center portion and a back portion. The front portion is convex and terminates in a point joining with the straight cutting edge, so as to increase the cutting pressure on the hide of an animal. The back portion forms a protuberance so that the hide of the animal may slide away from the center of the cutting section.

10 Claims, 1 Drawing Sheet

GAME KNIFE

CROSS-REFERENCE TO RELATED APPLICATION

This application claims the benefit of U.S. Provisional Patent Application Ser. No. 60/064,545, filed Nov. 5, 1997.

BACKGROUND OF THE INVENTION

1. Field of the Invention

The present invention relates generally to knives and, more particularly, to a knife for cleaning and dressing a game animal. More specifically, the knife comprises a blade having a perimeter defined by a parabolic cutting section, a straight cutting edge, a blunt top edge, blade sleeves, pins and a handle. In practice, the straight cutting edge is used to make an incision and then, the parabolic cutting section unfolds outwardly from the handle and properly dresses the animal proceeding with the front rounded portion.

2. Description of Related Art

Various knives have been developed in the past for cleaning and dressing of game animals. To field dress a game animal, the animal is either hung or laid on its side or back so that a hunter has access to the underside of the animal. The hunter then tries to dress the entrails and skin from the animal to prevent spoilage of the flesh and the hide.

Typically, the prior art discloses knives having blades and hooks to perform the above mentioned functions, namely cleaning and dressing the animals. Each hook includes a cutting slot, the hook used to push through the fur and the hide which is to be cut, and the slot then drawn toward the body of the hunter, so that the hide is cut by a sharpened interior edge of the slot. However, when the hide is bunched up, the slot becomes jammed. Therefore, the hook blade becomes inconvenient to use because the hook portion's main function to guide and separate the layers of hide and meat is thwarted. Furthermore, when these hook blades become dulled, the hook design is almost impossible to sharpen and thus ineffective to use.

Accordingly, a need will be seen for a knife that is useful and practical at any time and for any purpose in the field. In addition, there is a need for a device as described above that is easily and economically produced.

U.S. Pat. No. 5,359,778 issued to Seber et al. on Nov. 1, 1994 describes a knife with a cutting hook. The device includes a handle, a blade having a blade back, and a hook integral with the blade. This device does not provide an all-purpose function, since the hook can be jammed and can be inconvenient to use for cutting in situations other than dressing.

U.S. Pat. No. 4,607,432 issued to Montgomery on Aug. 26, 1986 describes a hunting knife for field dressing an animal. The device includes a hunting knife blade and a retractable gut hook. This device does not provide a convenient means to field dress an animal because of the multiple blades.

U.S. Pat. No. 4,283,854 issued to Austin on Aug. 18, 1981 describes a hunter's knife. The device includes a blade portion which includes a reversely facing hook-shaped portion with a sharpened arcuate inner edge portion formed on one side. The other side is a continuous blade. Again, the hook-shaped portion can become jammed when the hide layer of an animal bunches together.

U.S. Pat. No. 4,198,751 issued to Egbert on Apr. 22, 1980 describes a skinning knife. The device includes a notched cutting edge and an enlargement. This device also suffers from the disadvantage that it is inconvenient to use when the slot is jammed.

U.S. Pat. No. 3,883,952 issued to Strovas on May 20, 1975 describes a hide splitting and gutting device. The device includes a rod-like shaft having an arcuate head and a slot. This device does not provide an adequate separation means of the hide and the meat of the game animal.

U.S. Pat. No. 3,791,033 issued to Regan on Feb. 12, 1974 describes a skinning knife. The device includes a blade and a tip blade member. This device does not provide precision in separating the hide from the meat.

U.S. Pat. No. 3,605,268 issued to Cassell on Sep. 20, 1971 describes hunting knife. The device includes a notch having a blunt portion, a sharp under edge, a sharp round corner and a blunt upper edge, and a blade. The sharp round corner can be jammed while separating the hide from the flesh of an animal. Thereby, the device does not provide an effective means to separate the layers of the animal.

U.S. Pat. No. 3,363,315 issued to Anderson on Jan. 16, 1968 describes a hunting knife. The device includes a handle and two blades. Again, this device does not provide an effective way to separate the hide from the meat, because the two blades can be cumbersome.

U.S. Pat. No. 3,241,236 issued to Capps on Mar. 22, 1966 describes a knife having a plurality of blade portions and guide portions. The device may result in improperly field dressing the animals when the hide bunches up in the blade portions and the guide portions, thereby making the device less effective.

U.S. Pat. No. 1,843,223 issued to Hasseler on Feb. 2, 1932 describes a knife having a blade included a hook section. Again, the device suffers from the disadvantages described above.

U.S. Design Pat. No. 320,544 issued to Thompson on Oct. 8, 1991 describes a utility knife having a blade with different radii along the body the blade. The device does not effectively serve a means for cleaning and dressing game animals.

English abstracts of two foreign patents also describe devices which do not provide an effective means to clean and dress the game animals. The abstracts refer to Patent Number DT 2,741,692, issued to Ober on Mar. 22, 1979, which describes a knife having a guard preventing the blade from being used as a weapon while maintaining its ability to cut seat belts, and German Patent Number 1,225,073 issued to Sohn on Sep. 15, 1966, which describes a hunting knife having a bellied-out free blade portion and a top hook portion.

None of the above noted inventions and patents, taken either singly or in combination, is seen to describe the instant invention as claimed.

SUMMARY OF THE INVENTION

The present invention is a knife, intended for hunting purposes. Particularly, the knife is useful in cleaning and dressing of game animals, such as deer or fish. More specifically, the knife comprises a blade having a perimeter defined by a parabolic bottom cutting section, a straight cutting edge, a blunt top edge, blade sleeves, pins and a handle.

The parabolic cutting section includes a front portion and a back portion. The front portion has a convex shape and terminates in a point connecting with the straight cutting edge, so as to increase the cutting pressure of the hide of an animal. The back portion has a downward slope and forms a protuberance so that the hide of the animal may slide away from the center portion and also to help prevent accidental cuts of the hunter during use. The greatest curvature of the cutting section is about the center of blade defined by a mid-point between the front portion edge and the edge of the back portion blade.

In the field, once the game animals are killed, immediate attention to quickly eviscerate and skin the animals is recommended so as to avoid spoilage of the meat. So, it is a common practice by hunters to clean and dress the animals at the site of the kill. Normally, an incision is made through the skin or the hide and extended from the crotch to the throat. It is important to take extreme precaution so as to prevent puncturing the entrails or skin of the animal with the blade, because it would spoil the flesh and the hide of the animal. A conventional field knife is often used for this purpose. However, it requires a considerable skill by the hunter to avoid accidentally cutting himself and to properly skin the animals. Therefore, by the present invention, a game knife is disclosed.

Accordingly, it is a principal object of the present invention to provide an all purpose field knife in which the knife can effectively adapt to unpredictable cutting situations.

Another of the objects of the present invention is to provide a simple and practical knife.

Yet another of the objects of the present invention is to provide a knife for cleaning and dressing a game efficiently.

Still another of the objects of the present invention is to provide a single continuous blade knife for quick and easy use in a field.

A further object of the present invention is to provide a knife with a means for protecting against puncturing the entrails of a game animal.

An additional object of the present invention is to provide a quick and easy way to clean a game animal.

A final object of the present invention is to provide a convenient field knife which is economical to produce.

These and other objects of the present invention will be more readily apparent as the nature of the invention is hereinafter more fully described, illustrated and claimed with reference being made to the attached drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a knife for cleaning and dressing an animal. More specifically, the knife comprises a blade having a perimeter defined by a parabolic cutting section, a straight cutting edge, a blunt top edge, blade sleeves, pins and a handle.

The preferred embodiments of the various aspects of the present invention will now be explained with reference to the accompanying drawings. By way of illustration and not limitation, FIGS. 1 to 3 are presented to show the preferred embodiments of the applicant's invention.

Figure 1:
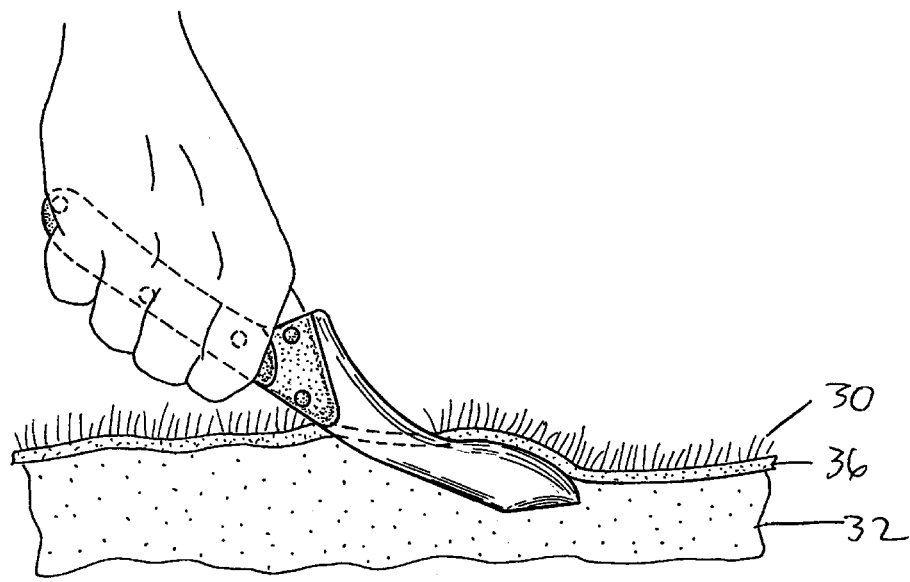
FIG. 1 is an environmental, elevational view of the present invention in use, shown with the meat and the hide of a game animal being separated.

In FIG. 1, the field knife 2 is shown used for cleaning and dressing purposes of a game animal. The knife 2 is shown illustrating the separation of the hide and the meat. Aside from skinning the game animal, a hunter may encounter many unpredictable situations in the field. The all purpose knife 2, the present invention, makes it easier for the hunter to adapt to any circumstances. The knife 2 has many different functions. Because of its useful nature, it enables the hunter to use it with a minimum amount of work. The knife is simple, practical and convenient for all purposes.

Figure 2:
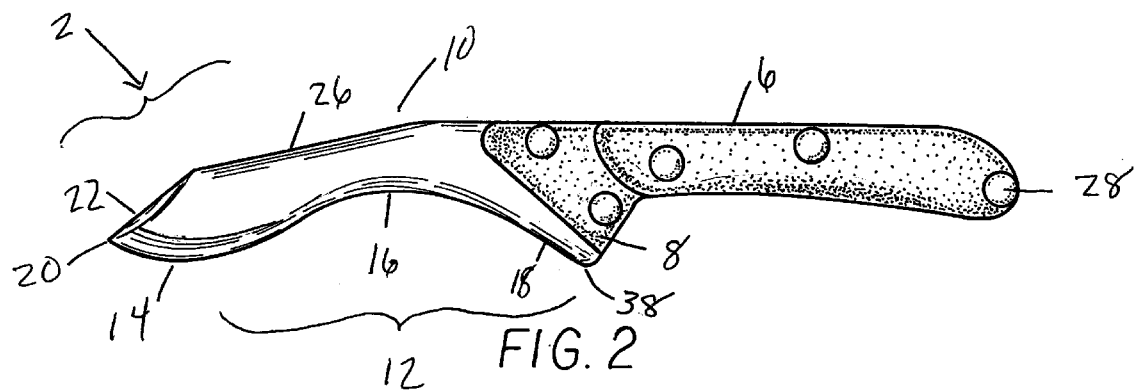
FIG. 2 is a side elevational plan view of the present invention.
Figure 3:
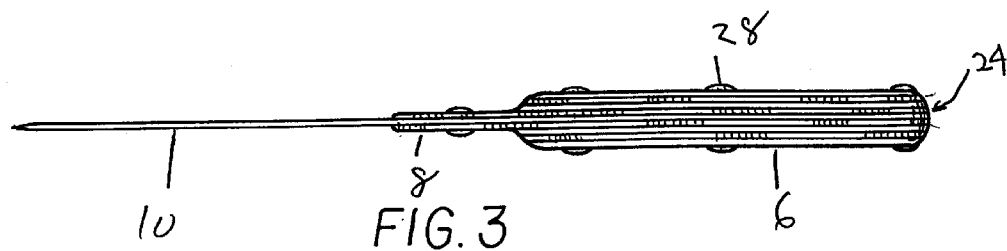
FIG. 3 is a top plan view of the present invention illustrating a continuous blade welded with blade sleeves and a handle.

Referring to FIGS. 2–3, the knife 2 comprises a handle 6 of multiple layers of metals 24, pins 28, blade sleeves 8 and a blade 10. The metal materials used preferably include stainless steel and brass. There are a total of nine layers of metals. An alternation of each layer of metals 24 is preferred starting with a stainless steel layer and ending with a stainless steel layer. The order of the metal layers is stainless steel, brass, stainless steel, brass, stainless steel, brass, stainless steel, brass, and stainless steel. The center stainless steel layer or the fifth layer extends beyond the rest of the metal layers and forms the single blade 10. The fourth and the sixth layers are brass and extend beyond the rest of the remaining layers and form the two blade sleeves 8. The blade sleeves 8 provide further strengthening of a back portion 18 of the blade 10 to withstand the pressure exerted by the force of skinning the hide of the game animal.

The single, continuous blade 10 comprises a perimeter defined by a substantially parabolic cutting section at a bottom portion 12, a blunt non-cutting top portion 26 extended to the handle 6 and a straight cutting edge 22. The straight cutting edge is integrally formed with the blunt top portion 26, and the blunt top portion extends angularly toward the handle of the knife 2.

The bottom portion of the blade includes a front portion 14, a center portion 16 and a back portion 18, wherein the front portion 14 has a convex shape and terminates anteriorly at a point 20 joining with the straight cutting edge 22 and posteriorly at a point of inflection 15. The point 20 of the front portion 14 is used to initiate an incision of the game animal. After the front portion penetrates, the convex front portion causes the hide to lift upward and exert pressure which properly separates the fur 30 and the hide 36 from the meat 32 while the parabolic center portion 16 cuts the hide without accidentally cutting through the entrails and skin. The concave center portion 16 represents the greatest curvature of the cutting section 12, which effectively slits the hide to clean and dress the game animal.

Lastly, the back portion 18 has a downward slope and forms a protuberance 38 so that the hide of the game animal may slide away from the curvature of the cutting section 12. The shape of the back portion 18 provides a continuous flow of the hide after being separated from the flesh of the animal, so that the hide does not bundle up and obstruct the blade cutting section 12. Also, the protuberance 38 helps to protect the hunter from accidentally cutting himself if slipping forward on the handle.

The blade sleeves 8 extend from the handle 6 to the blade 10 and terminate diagonally defining the end of the blunt top edge 26 and the back portion 18 of the blade 10. All three parts of the knife 2, the blade 10, the sleeves 8 and the handle 6 are integrally attached to one another by securing means.

The means for securing the blade 10, the sleeves 8 and the handle 6 together may be a machine weld and/or pins 28 passing from one side of the handle through the layers to the other side. Means for securing the blade 10 to the sleeves 8 is the same as the means for securing the blade 10, the sleeves 8 and the handle 6. There are at least three pins 28 attached to the handle 6 and at least two pins 28 attached to the sleeves 8.

In operation, an incision is made using the point of the front portion of the blade passing the blade beneath the hide while holding the blade with the cutting section 12 downward. To make the cut through the skin from the crotch to the throat, the knife 2 is rotated so that the cutting section faces upward. Proceeding with the convex front portion forward and upward, the front portion provides one of the many advantages of the present invention to amateurs or any ordinary skilled hunters to gently separate the hide and fur from the meat without puncturing the entrails and skin of the animal.

As the blade of the knife moves away from a hunter from the crotch to the throat, the hunter draws the parabolic cutting section upwardly by the handle against the hide of the animal. As the knife is drawn, the parabolic shape of the knife blade helps to protect the blade from accidentally puncturing the entrails or skin of the animal during the process of cleaning and field dressing. The back portion of the blade has a downward slope and forms a protuberance, so that the hide may slide away from the curvature of the center portion of the cutting section so as to maintaining the smoothness and effectiveness of the skinning techniques.

The novel and innovative design of the present invention is both safety-oriented and extremely effective in cleaning and dressing an animal. The unique design of the game knife of the present invention minimizes both the chance of accidental self-inflicted injury and the possibility of damaging the flesh and hide of a game animal as the animal is cleaned and dressed.

The preferred embodiment of the present invention disclosed herein is intended to be illustrative only and is not intended to limit the scope of the invention. It should be understood by those skilled in the art that various modifications and adaptations of the present invention as well as alternative embodiments may be contemplated. It is to be understood that the present invention is not limited to the embodiments described above, but encompasses any and all embodiments within the scope of the following claims.

I claim:

1. A field knife for cleaning and dressing of game animals, comprising:
    a handle comprising multiple layers of metals;
    a single blade having a perimeter defined by a substantially parabolic cutting section at a bottom portion, a blunt top portion extended angularly toward the handle, and a straight cutting edge wherein said straight cutting edge is integrally joined to said blunt top portion and said bottom portion;
    said cutting section of said blade comprising a front portion, a center portion, and a back portion with said front portion having a convex shape and terminating proximally at a point of inflection that joins with said center portion and distally with said straight cutting edge;
    said center portion having a concave curvature for properly skinning a game animal, and said back portion having a downwardly sloping inclination that forms a protuberance for maintaining an effective and efficient flow of a hide and fur of an animal away from said concave curvature;
    blade sleeves diagonally extending from said handle and terminating to define a terminal point of said blunt top portion and an end portion of said back portion of said cutting section with said sleeves integrally attached to said blade and said handle;
    means for attaching said blade to said sleeves and said handle; and
    means for attaching said sleeves and said blade.

2. The knife according to claim 1, wherein: said handle comprises nine layers of metals made from stainless steel and brass, wherein the two outermost layers, one on each side, are made from stainless steel and the intermediate layers are alternated between a layer of stainless steel and a layer of brass.

3. The knife according to claim 2, wherein: said blade sleeves are made of brass.

4. The knife according to claim 3, wherein: said means for attaching said sleeves, said blade, and said handle comprises at least three pins.

5. The knife according to claim 4, wherein said means for attaching said sleeves, said blade and said handle is machine welded.

6. The knife according to claim 5, wherein: said means for attaching said sleeves, said blade, and said handle comprises pins made of brass.

7. The knife according in claim 6, wherein: said means for attaching said sleeves and said blade comprises at least two pins.

8. A knife for any cutting purpose, comprising:
    a blade comprising a continuous cutting surface comprising a downwardly inclined straight cutting edge that is integrally joined to a convex cutting edge that is integrally joined to a substantially parabolic cutting edge;
    said blade having a blunt, non-cutting top edge; and
    blade sleeves that extend from a multi-layered handle.

9. A knife according to claim 8, wherein: said handle comprises alternating layers of steel and brass.

10. A knife according to claim 9, wherein: said handle, said blade sleeves, and said blade are welded together.

\* \* \* \* \*